Jan. 6, 1970  B. J. CALDWELL, SR., ET AL  3,487,694
MANOMETER
Filed March 20, 1968  3 Sheets-Sheet 1

Bruce J. Caldwell, Sr.
Carl P. Kriegel
INVENTORS

BY Charles E. Lightfoot
ATTORNEY

Bruce J. Caldwell, Sr.
Carl P. Kriegel
INVENTORS

BY Charles E. Lightfoot
ATTORNEY

Bruce J. Caldwell, Sr.
Carl P. Kriegel
INVENTORS

BY Charles E. Lightfoot
ATTORNEY

United States Patent Office 3,487,694
Patented Jan. 6, 1970

3,487,694
MANOMETER
Bruce J. Caldwell, Sr., P.O. Box 1081 77001, and Carl P. Kriegel, 4018 Lockwood Drive 77026, both of Houston, Tex.
Filed Mar. 20, 1968, Ser. No. 714,695
Int. Cl. G01l 7/18
U.S. Cl. 73—401
4 Claims

ABSTRACT OF THE DISCLOSURE

A manometer of a type having two vessels or receptacles mounted for vertical movement relative to each other and rigidly connected together by means forming a passageway through which a liquid may flow from one to the other of the vessels, whereby the relative heights of the vessels may be adjusted to cause the liquid to remain at the same level in the vessels so that the difference in the heights of the vessels will indicate the difference in the pressure of the fluids above the liquid therein. Electrical means is provided for indicating a null point of adjustment of the instrument.

BACKGROUND OF THE INVENTION

Manometers, as heretofore customarily constructed, fall into three general types. The first of these types comprises a stationary vessel, such as a U-tube containing a liquid the difference in whose level in the two legs of the tube is used to indicate a difference between the pressures of the fluids above the liquid in the two respective legs. Such an instrument is customarily of glass construction, subjected to low working pressures, necessitating the reading of the liquid level in each of the two legs in operating practice. Errors in the reading of an instrument of this kind are likely to result from the meniscus formed at the level of the liquid in each leg and due to variations in temperature which cause distortion of the scales provided on the legs.

Another type of manometer, commonly employed, makes use of a stationary vessel, and a movable vessel, connected to the stationary vessel by a flexible tube to allow the movable vessel to be adjusted vertically relative to the stationary vessel, whereby a difference between the pressures in the two vessels may be indicated. This type of instrument is not only subject to several of the disadvantages of the stationary U-tube type, but is also subject to the inaccuracies due to expansion and contraction of the connecting flexible tube.

A third type of manometer in common use, comprises a stationary vessel into which a vertical tube is extended with the lower end of the tube below the level of the liquid in the vessel.

The vessel and the vertical tube in this type of manometer comprise the two legs of the instrument, and the difference between the pressures exerted in the vessel and in the vertical tube is indicated by the rise of the liquid in the tube. This rise is accompanied by a depression of the liquid in the vessel, necessitating the use of a scale on the tube whose graduations are non-uniform. Moreover, variations in the cross-sectional area of the vessel and the tube at different levels therein causes errors in the reading of the instrument.

The present invention has for an important object the provision of a manometer which may not only be used for the measurement of pressure differences, but also is capable of employment as a primary standard for the determination of fluid pressures in a variety of pressure sources.

Another object of the invention is to provide a manometer of improved accuracy and reliability, which is easily portable when desired and which may be readily adapted for the determination of pressures in any desired terms or units.

A further object of the invention is the provision in a manometer of null point determination means of improved accuracy and dependability.

SUMMARY OF THE INVENTION

The manometer of the invention, briefly described, comprises a pair of liquid containing vessels or receptacles mounted for rotational movement about a horizontal axis to permit vertical adjustment of the positions of the vessels relative to each other, the vessels being connected in communication by a rigid tube or other rigid means forming a passageway through which liquid may flow from each of the vessels into the other vessel.

Means is provided for connecting each vessel to a source of fluid under pressure by which such fluid is introduced into the vessel above the liquid therein.

Electrical means in the form of a light source and a photo-cell is provided for one or both of the vessels, the photo-cell being positioned to be exposed to the light from the light source illuminating the interior of the vessel, and means being provided for indicating the amount of current flowing in the photo-cell circuit due to light transmittance, whereby a null point or accurately reproducible position of the vessel may be exactly determined.

The vessels are of cylindrical shape internally and means is provided for rotating the light source relative to the vessel upon which the null point mechanism is carried to maintain the light source and light detector in the same position of rotation relative to the surface of the liquid in the vessel in all positions of elevation of the vessel. By this means variations in the illumination due to changes in the relative position of rotation of the filament in the electrical lamp which serves as a light source with reference to the surface of the liquid in the vessel are avoided.

Suitable means, such as screw threaded mechanism of high precision is provided for rotating the vessel supporting means about its axis to accurately adjust the vertical positions of the vessel relative to each other.

The various objects and advantages of the invention will be apparent from the following detailed description of particular embodiments of the same when considered in conjunction with the annexed drawings.

DETAILED DESCRIPTION OF PARTICULAR EMBODIMENTS OF THE INVENTION

Figure 1:
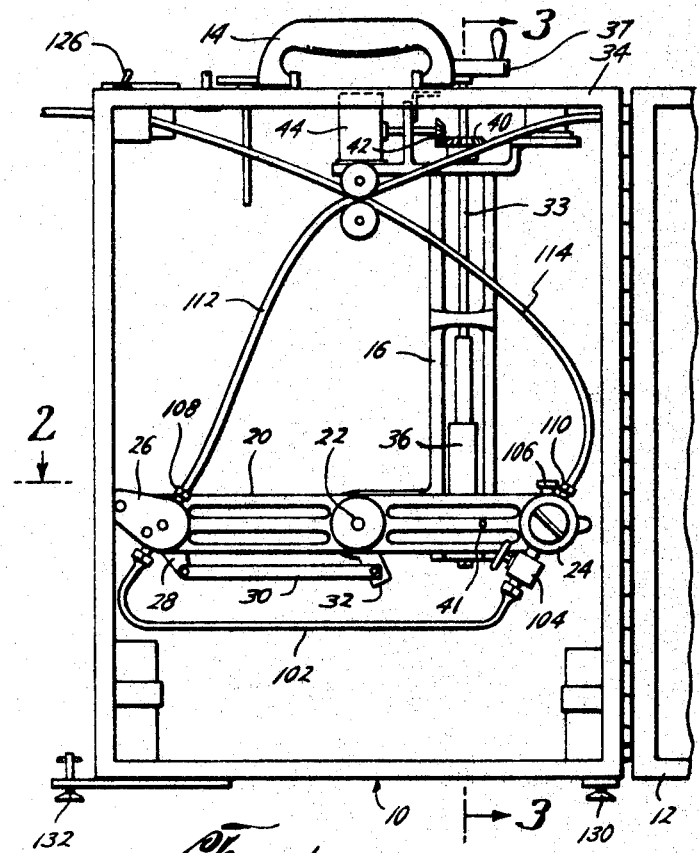
FIGURE 1 is a front elevational view of a preferred embodiment of the manometer of the invention mounted in a case or housing which may be opened or closed, illustrating the structure and arrangement of parts of the instrument, the case being shown in its open position, and the instrument in an initial position of its use.
Figure 3:
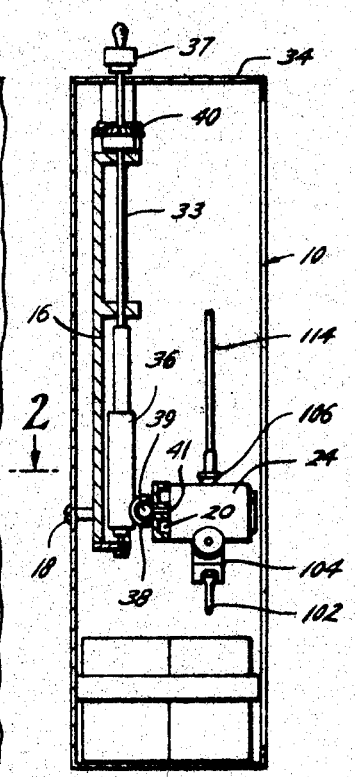
FIGURE 3 is a cross-sectional view, taken along the line 3—3 of FIGURE 1, looking in the direction indicated by the arrows.
Figure 2:
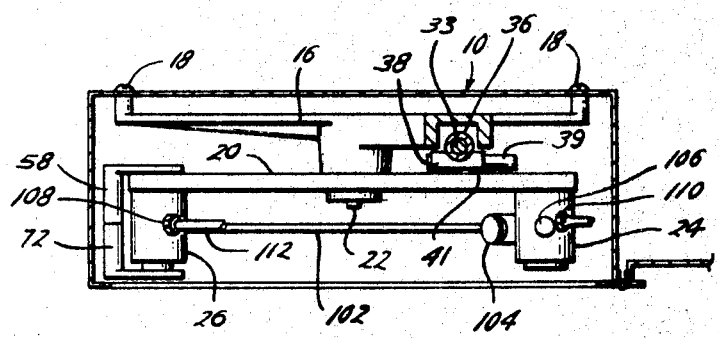
FIGURE 2 is a cross-sectional view of the invention as illustrated in FIGURE 1, taken along the line 2—2 of that figure, looking in the direction indicated by the arrows.
Figure 4:
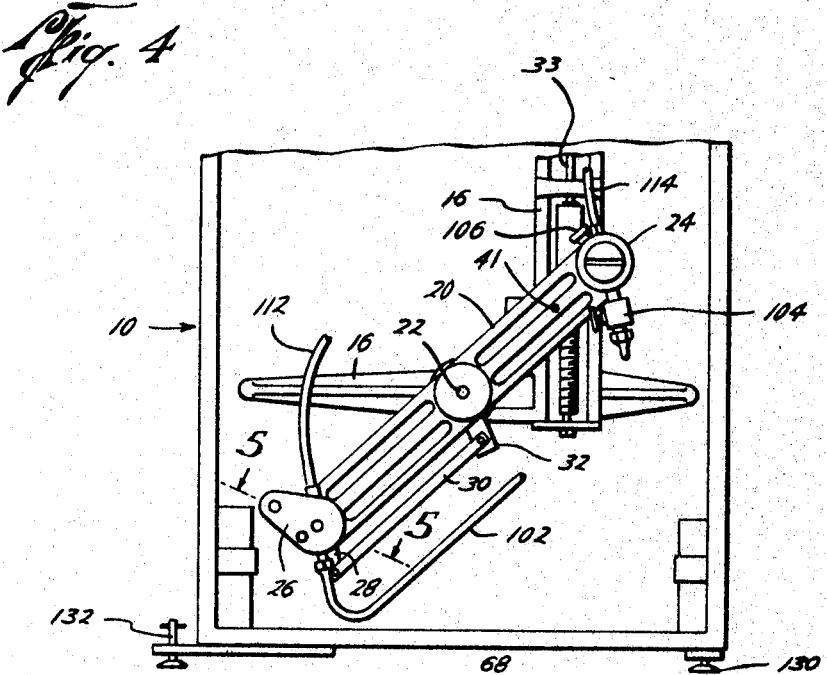
FIGURE 4 is a fragmentary view, similar to that of FIGURE 1, showing the instrument in one position of adjustment in the carrying out of a pressure measurement.

As shown in FIGURES 1 to 4 the manometer of the invention is housed in a casing which may take the form of a carrying case 10, of generally box shape having a hinged closure 12 and a carrying handle 14, by which the equipment is rendered portable. The manometer of generally inverted T-shape comprises a supporting frame 16, positioned in the case and suitably secured thereto, as by means of screws or bolts 18, with the upright of the T extending upwardly.

A beam 20 is pivotally mounted centrally of its length on the cross arm of the T for vertical tilting movement about a central horizontal axis 22. At one end of the beam a liquid vessel or receptacle 24 is fixedly mounted, and at the other end of the beam another liquid vessel or receptacle 26 is similarly mounted, the receptacles being located on horizontal axes parallel to the axis 22.

The beam 20 is adjusted vertically by rotating the beam about its central pivot 22, by means of a vertically disposed rotatable shaft 33 mounted on the frame 16 and extending upwardly therefrom through the upper wall or panel 34 of the casing and provided at its upper end with a handle 37 by which the shaft may be rotated. At its lower end the shaft 33 is threadably connected to an internally threaded tubular member or block 36 which in turn is connected to the beam 20 by a sliding connection, including a generally tubular member 38, slidably carried on an elongated bar 39, which is pivotally anchored at its midpoint to the beam 20, as by means of a pivot pin 41 located at a fixed distance from the pivot point 22 of the beam, to allow tilting movement of the bar about the anchor point 41 as the beam rotates about its pivot. By this arrangement, it will be apparent that the beam may be rotated about its pivot by rotation of the shaft 33, the member 38 sliding along the beam as the beam swings vertically.

It is to be noted that the distance between the pivotal point 22 of the beam 20 and the pivotal point 41 of the slide bar remains the same, the pivot point 41 serving as an anchor point by which the beam is tilted by rotation of the operating shaft 33. By this arrangement the distance to which the vessels 24 and 26 are raised or lowered is the same for each turn of the shaft. By suitably selecting the pitch of the threaded connection of the shaft 33 to the tube 36, the amount of vertical swinging movement of the beam for each complete turn of the shaft may be regulated as desired to represent any desired units of measurement of the instrument. The shaft 33 may be provided with a gear 40, rotatable therewith, which is in mesh with a gear 42 which drives counter mechanism 44, by which the number of turns of the shaft is translated to desired units of weight or other measure.

The vessel, or pot 24, is preferably of cylindrical internal shape, mounted on a horizontal axis normal to the longitudinal axis of the beam 20.

Figure 5:
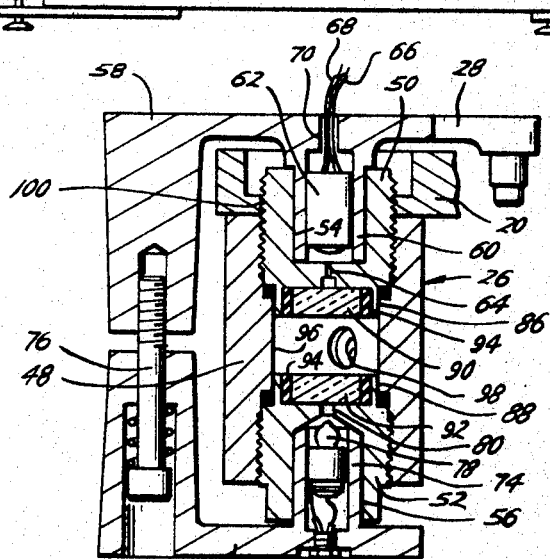
FIGURE 5 is a cross-sectional view on an enlarged scale, taken along the line 5—5 of FIGURE 4, looking in the direction indicated by the arrows.

The vessel or pot 26 is preferably constructed as shown in FIGURE 5, having a central tubular part 48 whose opposite end portions are internally threaded for the connection thereto of externally threaded end members or plugs 50 and 52 formed with outwardly opening counterbores 54 and 56, respectively. A photo-cell mount or holder 58 is provided at one end of the member 48, which mount has a cylindrical projection 60 extending into the counterbore 54 and forming a bearing for the end member 50. A photo-cell 62 is positioned in the projection through a central opening 64 through the bottom of the member 50 into the counterbore thereof. The photo-cell 62 is of a conventional type for connection into an electric circuit by means of conductors 66 and 68 which are extended through an opening 70 in the photo-cell mount.

At the other end of the member 48 an electric lamp mount or holder 72 is provided formed with a cylindrical projection 74 extending into the counterbore 56 of the end member 52 and forming a bearing for the end member. The mount 72 is connected to the mount 58, as by means of a screw or bolt 76, so that the mounts will be rotated together.

An electric lamp 78 is positioned within the projection 74 in the counterbore 56, so that light from the lamp may pass through a central opening 80 through the bottom of the end member 52, and the lamp is suitably provided with the usual conductors 82 and 84 extending through an opening in the mount 72 by which current is supplied to the lamp.

The end members 50 and 52 are formed with cylindrical end portions 86 and 88, respectively, extending inwardly into the member 48 and which carry transparent disks or windows 90 and 92, respectively. Each of the windows 90 and 92 is provided with suitable seal forming means, such as the rubber or plastic sleeve 94 forming a fluid tight seal between the window and the surrounding cylindrical portion of the end member to prevent leakage from within the cylinder 48 between the end members.

The cylindrical member 48 is thus formed with an annular chamber 96 between the windows 90 and 92 and the member 48 has an opening 98 through which liquid may flow into and out of the chamber.

The vessel or pot structure 26 is connected to the beam 20 by the end member 50 which is threadably extended through an opening 100 in the beam, so that the mounts 58 and 72 may rotate on the bearings 60 and 74 on a horizontal axis normal to the longitudinal axis of the beam.

The mount 58 has an arm 28 formed thereon to whose outer end one end of a link 30 is pivotally connected whose other end is pivotally connected to the outer end of an arm 32 fixedly attached to the frame 16. By this arrangement, it will be apparent that the beam 20, arm 58, link 30 and arm 32 form a parallelogram, by which the light source is maintained in a constant position of relative rotation with reference to the surface of the liquid in the vessel 26 as the beam is tilted about its pivot 22, so that any variation in the light intensity from the light source, such as might be caused by a change in the position of the filament of the electric lamp 78, resulting from tilting of the beam is avoided.

The vessel 24 has an opening, not shown, similar to the opening 98 of the vessel 26, and similarly located and through which liquid may flow in and out of the vessel through a tube or other rigid member 102 connected to the vessels and forming a passageway in communication with the interior of the chamber 90 through the opening 98 and with the interior of the vessel 24. The flow line 102 may have a valve 104 therein which may be closed to close the line.

A suitable liquid, such as mercury or other opaque liquid may be introduced into the vessel 24 through a filling opening 106 to fill the tube 102 and to provide liquid in the vessels to half fill the vessels when the beam 20 is in a horizontal position.

Each of the vessels is also provided with an inlet, such as those indicated at 108 and 110 to which suitable means, such as the flexible tubes or hoses 112 and 114 are connected by which fluid from a source whose pressure is to be tested may be introdudced into the vessels above the liquid therein. The flexible tubes may lead to different locations in a pressure fluid system for the purpose of measuring a difference in the pressure of fluid between such locations.

Figure 7:
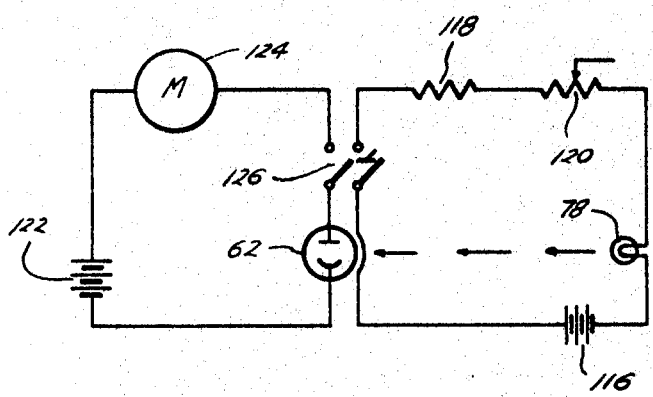
FIGURE 7 is a diagram of the electric circuits of the null point determination mechanism of the invention.

The electrical circuitry of the instrument is illustrated in the diagram of FIGURE 7, wherein the electric lamp 78 is shown connected into a circuit with a battery 116 or other suitable source of current, and with fixed and variable resistances 118 and 120 respectively, which are connected in series to control the amount of current supplied to the lamp.

The photo-cell 62 is shown connected into a circuit with a battery 122, or other suitable source of current and with a meter 124 of a suitable type by which the amount of current flowing in the photo-cell circuit is indicated. A double pole switch 126 may be provided for simultaneously opening and closing the lamp and photo cell circuits which are separate but are operated together.

Figure 6:
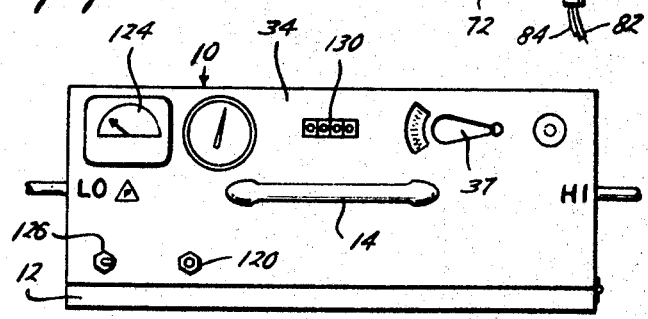
FIGURE 6 is a top view of the invention as illustrated in FIGURE 1, showing the instrument panel of the same.

The top wall or panel 34 of the case of the instrument may serve as an instrument panel for the equipment, as shown in FIGURE 6, the meter 124, switch 126 and variable resistance 120, being mounted thereon, and there being a window 130 therein through which the reading of the counter 44 may be observed.

Figure 8:
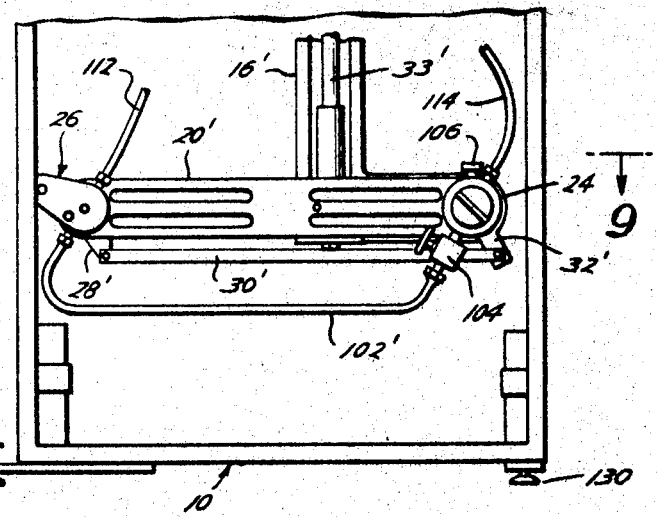
FIGURE 8 is a fragmentary view, similar to that of FIGURE 1, illustrating a somewhat modified form of the invention.
Figure 9:
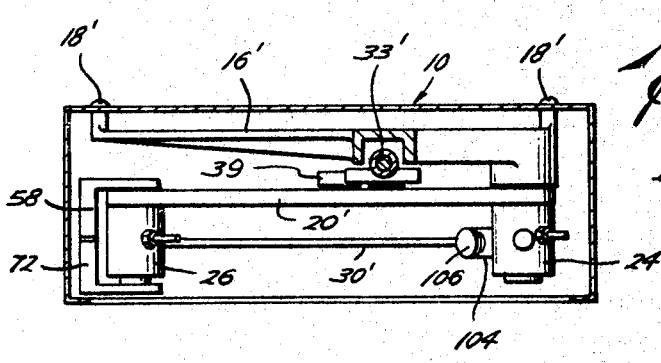
FIGURE 9 is a cross-sectional view, taken along the line 9—9 of FIGURE 8, looking in the direction indicated by the arrows.

A somewhat modified form of the invention is illustrated in FIGURES 8 and 9, wherein the beam 20' is pivotally mounted at the end upon which the vessel 24 is located, making it necessary to extend the link 30' for full distance between the axes of the vessels, and to position the operating shaft 33 and its connections between the pivot point of the beam and the vessel 26 in order to swing the beam vertically about the axis of the vessel 24. In other respects the construction and mode of operation of the form of the invention shown in FIGURES 8 and 9 is similar to that illustrated in FIGURES 1 to 7.

The instrument may be provided with foot elements, such as those indicated at 130 and 132, one or more of which, such as the element 132, may be adjustable to permit levelling of the instrument on a suitable support.

In making use of the manometer the null point of the instrument is determined by adjusting the position of the beam 20, with the lamp and photo cell circuits closed, to bring the liquid in the vessel 26 to a level to cause a desired current flow in the photo cell circuit, or to indicate a particular reading on the meter 124. It will then be apparent that the same reading on the meter will be obtained whenever the level of liquid in the vessel 26 reaches the same position.

The tubes 112 and 114 may then be connected into the pressure fluid system in which a pressure difference is to be determined between two locations therein. A difference in the pressure in the tubes 112 and 114 will then result in a change in the level of the liquid in the vessel 26, whereupon the liquid level may be restored to its previous level by actuation of the shaft 33 to tilt the beam 20 until the null point is restored on the meter 124. When the null point has been thus reestablished the weight of the manometer liquid head will be indicated by the counter mechanism 44 in selected units of weight or other measure.

It will be apparent that the light from the lamp 78 passing through the opening 80 and window 92 will pass through the window 86 and opening 64 to the photo cell 62 and when the liquid in the chamber 96 rises or falls below the level established as the null point the meter 124 will indicate a change in flow of current in the photo cell circuit.

As the beam 20 is tilted to bring the level of liquid in the chamber 96 to the null point level, the mounts 58 and 72 of the light sensor mechanism will be correspondingly rotated about their common axis, so that the filament of the lamp 78 and the photo cell 62 will be maintained in same positions relative to each other and to the surface of the liquid in the chamber 26 when the liquid reaches the null point level. More over, since the chamber 96 is annular the surface of the liquid therein when the liquid is at the null point level will always be the same, thus eliminating any error due to variations in the area of the liquid due to changes in the position of the vessel.

The manometer may, of course, be used to determine the pressure of a fluid relative to atmospheric pressure by connecting only one of the tubes 112 or 114 in communication with the pressure source while the other tube is left open to atmosphere. By using the manometer charged with a liquid of known density, such as mercury, and accurately calibrating the instrument, it may be used as a primary standard for the measurement of fluid pressure differences. When desired the manometer may be very accurately calibrated by using gauge blocks to determine the elevations of the vessels relative to each other.

It will thus be seen that the invention provides a manometer of simple design and rugged structure by which pressure measurement of great precision can be made and in which the human error is reduced to a minimum.

The invention is disclosed herein in connection with certain specific embodiments of the same which are intended to be illustrative only, it being evident that various changes can be made within the spirit of the invention.

Having thus clearly shown and described the invention, what is claimed as new and desired to secure by Letters Patent is:

1. A manometer comprising
    horizontally spaced apart receptacles,
    means supporting the receptacles to permit the varying of the vertical positions of the receptacles relative to each other,
    means rigidly connecting the receptacles together and providing a passageway for the flow of liquid from one to the other of the receptacles,
    a liquid filling said passageway and extending into the receptacles,
    means for connecting each receptacle to a source of compressible fluid under pressure and through which such fluid may flow into the receptacle above the liquid therein,
    electrical means including an electric lamp positioned to project light over the surface of the liquid in one of said receptacles along a horizontal axis,
    a photo-cell positioned on said axis in position to receive light from said lamp, and,
    means mounting the lamp and photo-cell for rotational movement on said axis in response to a variation in the relative vertical positions of the receptacles to rotate the lamp and photo-cell in the same relative position of rotation on said axis in all relative positions of said receptacles.

2. The manometer as claimed in claim 1, wherein said supporting means is a rigid beam pivotally supported mediate its ends for vertical swinging movement about a horizontal axis.

3. The manometer as claimed in claim 1, wherein said supporting means is a beam pivotally supported at the location of one of said receptacles for vertical swinging movement.

4. The manometer as claimed in claim 1 wherein said electrical means includes
an electrical circuit into which said photo-cell is connected,
a source of electric current in said circuit, and,
means for indicating the variation of current flowing in said circuit.

References Cited
UNITED STATES PATENTS

| | | | |
|---|---|---|---|
| 1,191,416 | 7/1916 | Gibson | 73—405 XR |
| 1,308,626 | 7/1919 | Crowell | 73—405 XR |
| 3,025,405 | 3/1962 | Dadas | 73—401 XR |

DONALD O. WOODIEL, Primary Examiner

U.S. Cl. X.R.

73—398